United States Patent [19]

Nevitt

[11] Patent Number: 4,677,085
[45] Date of Patent: Jun. 30, 1987

[54] PROCESS FOR REMOVING METALS FROM SPENT CATALYST

[75] Inventor: Thomas D. Nevitt, Naperville, Ill.

[73] Assignee: Amoco Corporation, Chicago, Ill.

[21] Appl. No.: 782,205

[22] Filed: Sep. 30, 1985

[51] Int. Cl.$^4$ .................. B01J 38/66; B01J 23/92; C01G 31/00; C22B 34/22

[52] U.S. Cl. .................. 502/26; 75/121; 208/52 CT; 405/128; 405/129; 423/54; 423/68; 423/150; 502/25; 502/28; 502/516

[58] Field of Search .................. 502/25–28, 502/516; 208/52 CT; 423/54, 68, 150; 75/121

[56] References Cited

U.S. PATENT DOCUMENTS

| | | | |
|---|---|---|---|
| 3,020,239 | 2/1962 | Flinn et al. | 502/28 |
| 3,213,033 | 10/1965 | Hindin et al. | 502/28 |
| 3,255,102 | 6/1966 | Sanford et al. | 502/516 |
| 3,684,738 | 8/1972 | Chen | 502/26 |
| 3,791,989 | 2/1974 | Mitchell et al. | 502/516 |
| 4,280,897 | 7/1981 | Shah et al. | 502/516 |
| 4,394,355 | 7/1983 | Fruge | 423/150 |

FOREIGN PATENT DOCUMENTS

| | | | |
|---|---|---|---|
| 33191 | 3/1975 | Japan | 502/26 |
| 162950 | 9/1984 | Japan | 502/516 |

Primary Examiner—P. E. Konopka
Attorney, Agent, or Firm—Ekkehard Schoettle; William H. Magidson; Ralph c. Medhurst

[57] ABSTRACT

This invention pertains to a new process for removing metals, especially contaminant metals, from spent catalysts. Also, this invention pertains to a catalyst composite with metals removed by the new process, and to several uses for the catalyst, including as a rejuvenated hydrotreating catalyst. The new process comprises (i) contacting the spent catalyst with a complexing agent with four or more coordinating groups, including at least two carboxylic acid type groups and at least one amino type group, and (ii) separating from the spent catalyst a mixture containing the complexing agent and the removed metals. By this process contaminant metals, like vanadium, are more selectively removed from the spent catalyst than are catalytic metals, like cobalt and molybdenum.

2 Claims, No Drawings

PROCESS FOR REMOVING METALS FROM SPENT CATALYST

BACKGROUND OF THE INVENTION (1) Field of the Invention

This invention pertains to the conversion of hydrocarbons, especially hydrotreating them, in the presence of a catalyst composite. This invention also pertains to removing metals, especially contaminant metals, from spent hydrotreating catalysts.

In the process of this invention, metals on the spent catalyst are removed by first contacting the catalyst with a specific type of complexing agent. Then, a mixture containing the complexing agent and the removed metals is separated from the spent catalyst. Afterwards, the spent catalyst with the contaminant metals removed may be further treated to restore the catalyst to its fresh, or nearly fresh, state. Or the spent catalyst minus the removed metals may be disposed of, in a landfill, for example, with less worry that the contaminant or catalytic metals will be leached from the landfill to pollute ground water supplies. Also, the mixture containing the complexing agent and the removed metals may be treated to extract and collect from it valuable contaminant or catalytic metals.

(2) Description of the Prior Art

U.S. Pat. No. 3,791,989 discloses rejuvenating used hydrotreating catalyst by contacting it with an aqueous solution comprising oxalic acid before burning coke from it.

Canadian Pat. No. 1,110,221 discloses treating deactivated catalyst with steam and then contacting it with an aqueous mineral acid solution, especially sulfuric acid, to extract contaminant vanadium from it.

Published European Patent Application No. 79301809.4, filed Sept. 3, 1979, discloses regenerating spent catalyst by contacting it with an aqueous solution of a heteropoly acid containing two metals, one selected from phosphorous, silicon, titanium, germanium, arsenic, zirconium, thorium, or cerium; and the other selected from molybdenum, tungsten, niobium or tantalum.

I have discovered that metals can be effectively removed from spent catalyst by (i) contacting the spent catalyst with a complexing agent with four or more coordinating groups, including at least two carboxylic acid type groups and at least one amino type group, and (ii) separating from the spent catalyst a mixture containing the complexing agent and the removed metals. By my method, contaminant metals are more selectively removed from the spent catalyst than are catalytic metals, and the selectively for removal of contaminant metals versus catalytic metals may be adjusted by controlling the pH of the contact solution or mixture containing the complexing agent.

BRIEF SUMMARY OF THE INVENTION

This invention pertains to a new process for removing metals, especially contaminant metals, from spent catalysts. Also, this invention pertains to a catalyst composite with metals removed by the new process, and to several uses for the catalyst, including use as a rejuvenated hydrotreating catalyst. The new process comprises (i) contacting the spent catalyst with a complexing agent with four or more coordinating groups, including at least two carboxylic acid type groups and at least one amino type group, and (ii) separating from the spent catalyst a mixture containing the complexing agent and the removed metals. By this process contaminant metals, like vanadium, are more selectively removed from the spent catalyst than are catalytic metals, like cobalt and molybdenum.

DETAILED DESCRIPTION OF THE INVENTION

Hydrotreating hydrocarbons, especially petroleum fractions, is a well-known method for converting them to more valuable products. For example, a gas oil fraction may be hydrotreated to produce a range of diesel fuels or other distillate products. Also, hydrotreating is effective for reducing the sulfur and nitrogen content of petroleum fractions, increasing their value as less-polluting fuels, for example. Or, a residuum fraction with components boiling above 1,000° F. may be hydrotreated to reduce the amount of contaminant metals, like vanadium and nickel, for example, and to produce, by cracking the feedstock, for example, a full-boiling range of petroleum products.

Hydrotreating is usually done at elevated temperatures and pressures in the ranges of 550°–1,000° F., with the higher temperatures in the range for higher average boiling point feedstocks, and 200–2,000 psia., respectively, in the presence of hydrogen and an alumina catalyst support containing Group VIB and VIII catalytic metals such as molybdenum, cobalt and nickel. Generally the catalyst comprises from about 2 to about 20 weight % molybdenum, and from about 0.1 to about 6 weight % cobalt, on an elemental basis. By catalytic metals I mean metals intentionally composited with the catalytic support material to impart to the finished catalyst a particular reaction rate or selectivity effect when the catalyst is used for the conversion of hydrocarbons.

During use of the catalyst, its effectiveness is diminished because hydrocarbon residues in the form of coke and contaminant metals such as nickel and vanadium from the feedstock, for example, deposit and build up on its surface and in its pores. By contaminant metals I mean metals incidentally composited with the catalyst. In some cases residues of the same metal which is used as a catalytic metal deposit incidentally as a contaminant metal on the catalyst. Nickel is an example of a metal which may be both a catalytic metal and a contaminant metal. In this case the metal intentionally put on the catalyst as a catalytic metal remains "catalytic metal," and the same-metal residue incidentally deposited during use of the catalyst becomes a "contaminant metal."

Contaminant metals may be from the feedstock, feedstock additives, or even from the hydrotreating process equipment. The coke and contaminant metals build-up reduces catalyst activity and selectivity, thereby resulting in deactivated, or spent catalyst. Catalyst activity is a measure of the catalyst's ability to help convert reactants into products at a specified severity level, where severity level means the reaction conditions used, that is the temperature, pressure, contact time, and presence of diluents, if any. Catalyst selectivity is a measure of the catalyst's ability to help produce a high amount of desired products relative to the amount of reactants charged or converted. An objective in the art of hydrotreating has been to effectively remove this build-up and restore or rejuvenate the spent catalyst to its fresh or nearly fresh state, with high activity and selectivity.

Typically, the coke portion of the build-up is removed by contacting the catalyst with an oxygen-containing gas at an elevated temperature in the range of 600° F.–1,000° F., or higher, to burn carbon and hydrogen which makes up most of the coke. The coke may be removed before or after the contaminant metals build-up is removed.

The contaminant metals portion of the build-up is removed by (i) contacting the spent catalyst with a complexing agent with four or more coordinating groups, including at least two carboxylic acid type groups and at least one amino type group, and (ii) separating from the spent catalyst a mixture containing the complexing agent and the removed metals.

In my process the catalyst is contacted with a specific type of complexing agent. The complexing agent is an organic molecule or ion that can combine or coordinate, at more than one position with a metal ion. In my complexing agent there are 4 or more such positions which coincide with 4 or more electron donor groups or coordination groups. Of these 4 or more coordination groups, at least two are of the carboxylic acid type and at least one is of the amino type. By carboxylic acid type I mean a coordination group containing the univalent radical -COOH. By amino type I mean a coordination group containing nitrogen combined with a non-acid organic radical.

Preferably, the complexing agent has 4, 5, or 6 coordination groups. Specific examples of the complexing agent are, for example, the aminopolycarboxylic acids: N-hydroxyethyliminodiacetic acid, nitrilotriacetic acid (NTA). N,N,N',N'-ethylenediaminetetraacetic acid (EDTA), and N-hydroxyethyl-N,N',N'-ethylenediaminietriacetic acid (HEDTA).

The complexing agent may be dissolved in or mixed with other compounds. When I used EDTA, for example, I used it in a 20 weight % EDTA tetrasodium salt in water solution. The pH of the solution was 10.4.

Generally, the complexing agent, solution, or mixture is contacted in the liquid phase with the solid spent catalyst particles. The catalyst may be soaked, rinsed, or mixed and washed with the complexing agent. Contacting conditions including time, temperature, and pressure may be adjusted for different results. In my experimental work, I soaked the spent catalyst in the complexing agent solution for 24 hours at room temperature and pressure.

I think the best way to practice my invention is to remove the spent catalyst from the reactor and mix or slurry it with a 10-20 weight % aqueous solution of the complexing agent EDTA. The amount of EDTA should be enough to provide at least one to several times the stoichiometric amount of EDTA to contaminant metal atoms or ions. I prefer contacting temperatures between 100°–200° F., and pressures compatible with mixing or slurrying with aqueous solutions, namely 10-100 psi.

After contacting, the solution or mixture containing the complexing agent and the removed metals is separated from the spent catalyst. The solution or mixture may be decanted, drained, or rinsed from the catalyst. Then, the solution or mixture may be further treated to collect valuable catalytic and contaminant metals from it by conventional metals-refining means. The spent catalyst with the metals removed may also be further treated to restore it to its fresh or nearly fresh state for hydrotreating hydrocarbons. For example, it may be dried and calcined and its catalytic metals amounts and/or oxidation states may be adjusted to provide a rejuvenated catalyst with high activity and selectivity. Or the spent catalyst with the metals removed may be discarded as stabilized landfill material, with less worry that the catalytic or contaminant metals will be leached from it to possibly pollute ground water supplies.

EXAMPLE I 20 grams of a spent hydrotreating catalyst containing approximately 16.0 weight % vanadium, 4.9 weight % nickel, 3.8 weight % molybdenum, 0.65 weight % cobalt, 25 weight % carbon, 14 weight % sulfur, and the balance of the elements being mainly oxygen and aluminum was soaked for 24 hours at room temperature and pressure in 200 ml. of a 20 weight % EDTA tetrasodium salt in water solution. The pH of the EDTA solution was 10.4. For this spent catalyst, molybdenum and cobalt were catalytic metals, while vanadium and nickel were contaminant metals. 192 ml. of dark green liquid was drained and recovered from the soaked catalyst. Upon analysis it contained 3060 ppm by weight vanadium, 710 ppm nickel, 400 ppm molybdenum, and 67 ppm cobalt. The metals removal results from this experiment are summarized in Table I.

TABLE I

| | on spent catalyst (weight ratio) | in removed solution (weight ratio) | change (%) |
|---|---|---|---|
| 1. | $\frac{V}{Co} = 24.6$ | $\frac{V}{Co} = 45.7$ | 86 |
| 2. | $\frac{V}{Mo} = 4.2$ | $\frac{V}{Mo} = 7.7$ | 83 |
| 3. | $\frac{Ni}{Co} = 7.5$ | $\frac{Ni}{Co} = 10.6$ | 41 |
| 4. | $\frac{Ni}{Mo} = 1.3$ | $\frac{Ni}{Mo} = 1.8$ | 38 |
| 5. | $\frac{V}{Ni} = 3.3$ | $\frac{V}{Ni} = 4.3$ | 30 |
| 6. | $\frac{Co}{Mo} = .17$ | $\frac{Co}{Mo} = .17$ | 0 |

According to Table I, the weight ratios of vanadium and nickel to cobalt and molybdenum, respectively, increased from 38% to 86% from the spent catalyst to the separated solution containing the complexing agent and the removed metals. This means that the contaminant metals vanadium and nickel were removed more selectively from the spent catalyst by the action of the complexing agent than were the catalytic metals cobalt and molybdenum. Vanadium was removed more selectively than nickel which was removed more selectively than cobalt and molybdenum, which were removed in the same relative proportion. Thus, by practicing my process, one can selectively remove contaminant metals relative to catalytic metals from spent catalysts.

EXAMPLE II

The same experiment as in Example I was carried out except the pH of the complexing agent solution was lowered from 10.4 to 8.0 by adding several milliliters of sulfuric acid. 190 ml. of a dark green solution was recovered. Upon analysis it contained 3,740 ppm by weight vanadium, 750 ppm nickel, 780 ppm molybdenum, and 96 ppm cobalt. The metals removal results from this experiment are summarized in Table II.

TABLE II

| | on spent catalyst (weight ratio) | in removed solution (weight ratio) | change (%) |
|---|---|---|---|
| 1. | $\frac{V}{Co} = 24.6$ | $\frac{V}{Co} = 39.0$ | 58 |
| 2. | $\frac{V}{Mo} = 4.2$ | $\frac{V}{Mo} = 4.8$ | 14 |
| 3. | $\frac{Ni}{Co} = 7.5$ | $\frac{Ni}{Co} = 7.8$ | 4 |
| 4. | $\frac{Ni}{Mo} = 1.3$ | $\frac{Ni}{Mo} = 1.0$ | −23 |
| 5. | $\frac{V}{Ni} = 3.3$ | $\frac{V}{Ni} = 5.0$ | 52 |
| 6. | $\frac{Co}{Mo} = .17$ | $\frac{Co}{Mo} = .12$ | −29 |

According to Table II the weight ratio of vanadium to cobalt and molybdenum, respectively, increased from 14% to 58% from the spent catalyst to the separated solution containing the complexing agent and the removed metals. This means that vanadium was removed more selectively than were cobalt and molybdenum. The weight ratio of nickel to cobalt increased slightly, and the ratio of nickel to molybdenum decreased 23%. This means that nickel was slightly more selectively removed than cobalt, but less selectively removed than molybdenum. The weight ratio of cobalt to molybdenum decreased 29%, meaning that molybdenum was more selectively removed than cobalt.

So from Tables I and II, one can see that the selectivity of the complexing agent for removal of metals may be adjusted by controlling the pH of the contact solution or mixture containing the complexing agent. For example, in Example I and Table I, where the contact solution pH was 10.4, the weight ratio of nickel to molybdenum increased 38% from the spent catalyst to the removed solution, indicating the solution was more selective for nickel than for molybdenum. In Example II and Table II, on the other hand, where the contact solution pH was 8.0, the weight ratio of nickel to molybdenum decreased 23% from the catalyst to the solution, indicating the solution at the different pH was more selective for molybdenum than for nickel. So, when one desires to remove nickel rather than molybdenum, one should maintain the pH of the contact solution between 9-11, especially between 10-11, and when one desires to remove molybdenum rather than nickel, one should maintain the pH between 7-9, especially between 7.5-8.5.

I claim:

1. A process for removing contaminant vanadium from spent catalyst which comprises:
   i. contacting spent catalyst comprising an alumina support containing from about 2 to about 20 weight % catalytic molybdenum and from about 0.1 to about 6 weight % catalytic cobalt, on an elemental basis, with a 10-20 weight % aqueous solution of EDTA with a pH between 7-11, and
   ii. separating from the spent catalyst a mixture containing EDTA and removed vanadium, wherein the weight ratio of vanadium to molybdenum and vanadium to cobalt in the mixture separated from the spent catalyst is greater than the ratios, respectively, of vanadium to molybdenum and vanadium to cobalt on the spent catalyst before contact with said solution of EDTA.

2. A process for rejuvenating a spent catalyst, whereby contaminant vanadium is removed, which comprises:
   i. contacting spent catalyst comprising an alumina support containing from about 2 to about 20 weight % catalytic molybdenum, and from about 0.1 to about 6 weight % catalytic cobalt, on an elemental basis, with a 10-20 weight % aqueous solution of EDTA with a pH between 7-11, and
   ii. separating from the spent catalyst a mixture containing EDTA and removed vanadium, wherein
   the weight ratio of vanadium to molybdenum and vanadium to cobalt in the mixture separated from the spent catalyst is greater than the ratios, respectively, of vanadium to molybdenum and vanadium to cobalt on the spent catalyst before contact with said solution of EDTA, and
   iii. burning coke from the spent catalyst.

* * * * *